(12) United States Patent
Cameron et al.

(10) Patent No.: US 6,375,122 B1
(45) Date of Patent: *Apr. 23, 2002

(54) REINFORCED ELASTOMER PANEL

(75) Inventors: Dean Emory Cameron, Maryland Heights; Paul Francis Geders, Florissant; Michael Watson Geiger, St. Louis; Dennis Allan Roberts, Ballwin; Robert Henry Wille, St. Charles, all of MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/294,443

(22) Filed: Aug. 17, 1998

Related U.S. Application Data (62) Division of application No. 08/807,295, filed on Feb. 27, 1997, now Pat. No. 6,027,074.

(51) Int. Cl.⁷ .................................................. B64C 39/00
(52) U.S. Cl. ........................................ 244/133; 244/123
(58) Field of Search .............................. 244/75 R, 133, 244/219, 123; 160/236; 16/225; 29/897.32, 401.1

(56) References Cited

U.S. PATENT DOCUMENTS

| | | | |
|---|---|---|---|
| 1,379,921 A | 5/1921 | Holle | |
| 2,039,372 A | 5/1936 | Wickman | |
| 2,368,702 A | 2/1945 | Bourne | |
| 2,731,221 A | 1/1956 | Holton | |
| 2,973,170 A | 2/1961 | Rodman | |
| 3,893,639 A | 7/1975 | Croswell | |
| 4,429,844 A | 2/1984 | Brown et al. | |
| 4,892,626 A | 1/1990 | Covey | |
| 5,222,699 A | 6/1993 | Albach et al. | 244/213 |
| 5,662,294 A | 9/1997 | Maclean et al. | |
| 5,810,291 A | 9/1998 | Geiger et al. | |
| 5,892,877 A | 4/1999 | Meyerhoefer | |
| 5,896,191 A | 4/1999 | Beier et al. | |
| 5,913,494 A | 6/1999 | Burbridge et al. | |
| 5,927,651 A | 7/1999 | Geders et al. | |
| 5,941,480 A | 8/1999 | Wille | |
| 5,947,417 A | 9/1999 | Cameron | |
| 5,947,422 A | 9/1999 | Wille | |
| 5,958,803 A | 9/1999 | Geiger | |
| 5,975,463 A | 11/1999 | Gruensfelder et al. | |
| 5,979,828 A | 11/1999 | Gruensfelder et al. | |
| 6,027,074 A | 2/2000 | Cameron et al. | |
| 6,048,581 A | 4/2000 | Waldrop, III | |

FOREIGN PATENT DOCUMENTS

FR 1536953 10/1963

OTHER PUBLICATIONS

U.S. S/N 08/932,947; filed Sep. 17, 1997; (allowed).
U.S. S/N 09/082,817; filed May 21, 1998; (pending).
U.S. S/N 09/108,858; filed Jul. 1, 1998; (pending).
U.S. S/N 08/898,162; filed Jul. 22, 1997; (allowed).
U.S. S/N 08/897,341; filed Jul. 21, 1997; (pending).
U.S. S/N 08/718,771; filed Aug. 20, 1998; (pending).
U.S. S/N 08/814,497; filed Mar. 10, 1997; (pending).
U.S. S/N 09/094,299; filed Jun. 9, 1998; (pending).
U.S. S/N 08/576,466; filed Dec. 21, 1995; (allowed).
U.S. S/N 09/294,443; filed Aug. 17, 1998; (pending).
U.S. S/N 09/294,444; filed Aug. 17, 1998; (pending).

*Primary Examiner*—Charles T. Jordan
*Assistant Examiner*—Tien Dinh
(74) *Attorney, Agent, or Firm*—Harness Dickey & Pierce P.L.C.

(57) ABSTRACT

A reinforced elastomer panel (100) has a first rigid member (104) with an edge (116) attached to a first end of an elastomer panel (114). The first rigid member (104) has a removable plate (106) that provides access to a cavity (108). Attached to the first rigid member (104) is a reinforcing member (102) that extends through the elastomer panel (114). A second ridge member (118) has an edge attached to a second end of the elastomer panel (114).

6 Claims, 12 Drawing Sheets

REINFORCED ELASTOMER PANEL

This is a division of application Ser. No. 08/807,295, filed on Feb. 27, 1997, now U.S. Pat. No. 6,027,074.

FIELD OF THE INVENTION

The present invention relates generally to the field of flexible elastic panels and more particularly to the field of reinforced elastomer panels.

BACKGROUND OF THE INVENTION

Figure 1:
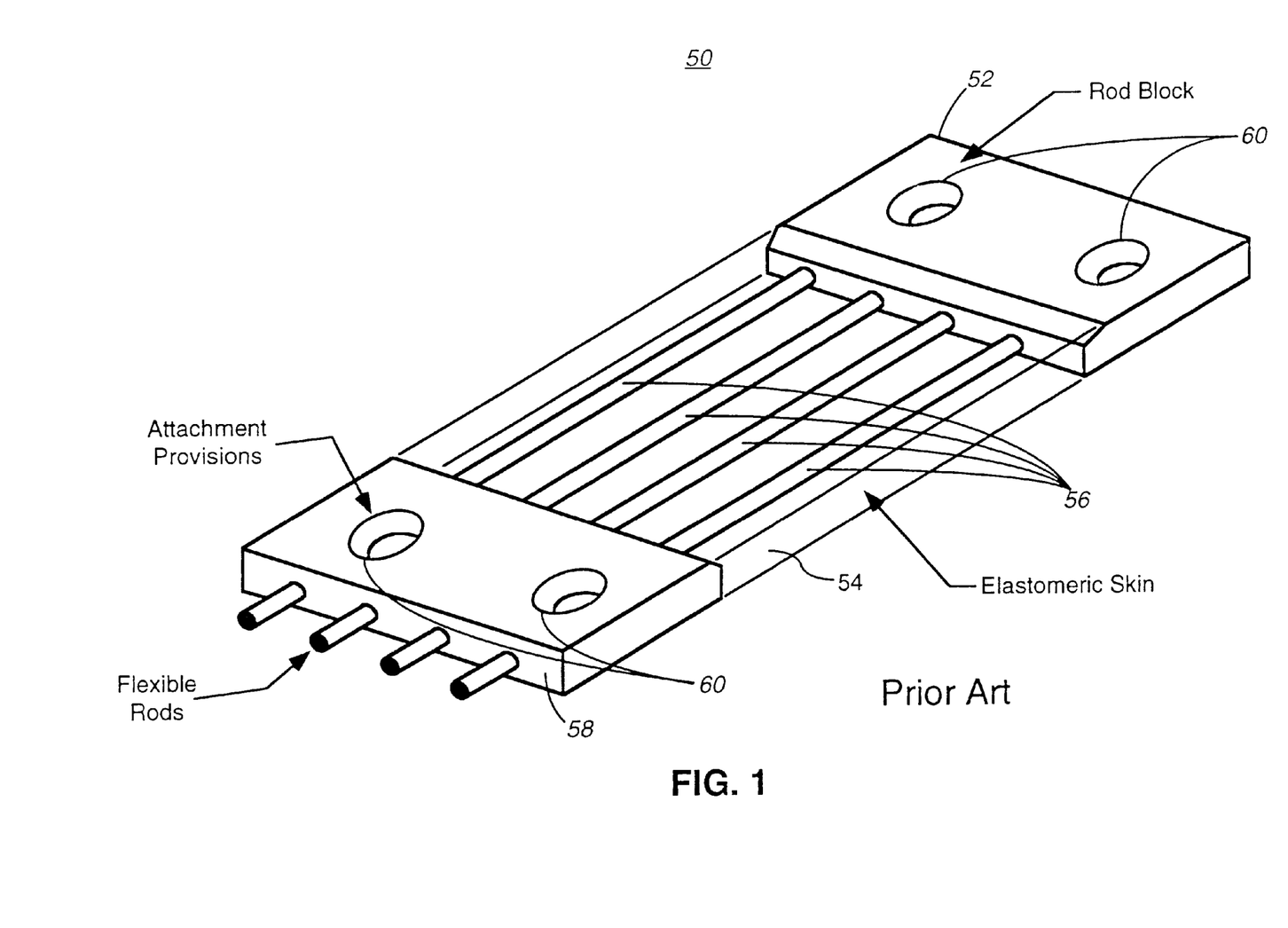
FIG. 1 is a perspective view of a prior art reinforced elastomer panel.

Reinforced elastomer panels are applicable for use on aircraft to eliminate gaps around control surfaces. Open gaps result in turbulence and leakage that result in reduced effectiveness of the control surface. A prior art reinforced elastomer panel 50 is shown in FIG. 1. The elastomer panel 50 has a rod block 52 attached along one edge to an elastomeric skin 54. The elastomeric skin 54 is capable of stretching to up to 100% of its unstressed length. A plurality of rods 56 are permanently attached to the rod block 52 and are allowed to slide freely inside the elastomer skin 54. The rods 56 provide the elastomeric skin 54 with a curvilinear shape when the elastomer panel 50 is elongated, deflected or twisted.

A second rod block 58 is attached to an opposite edge of the elastomeric skin 54. The second rod block 58 has a plurality of holes through which the plurality of rods 56 are allowed to slide freely. Both the rod block 52 and the second rod block 58 have attachment provisions 60, for attaching the elastomer panel 50 to the surface of an aircraft.

Figure 2:
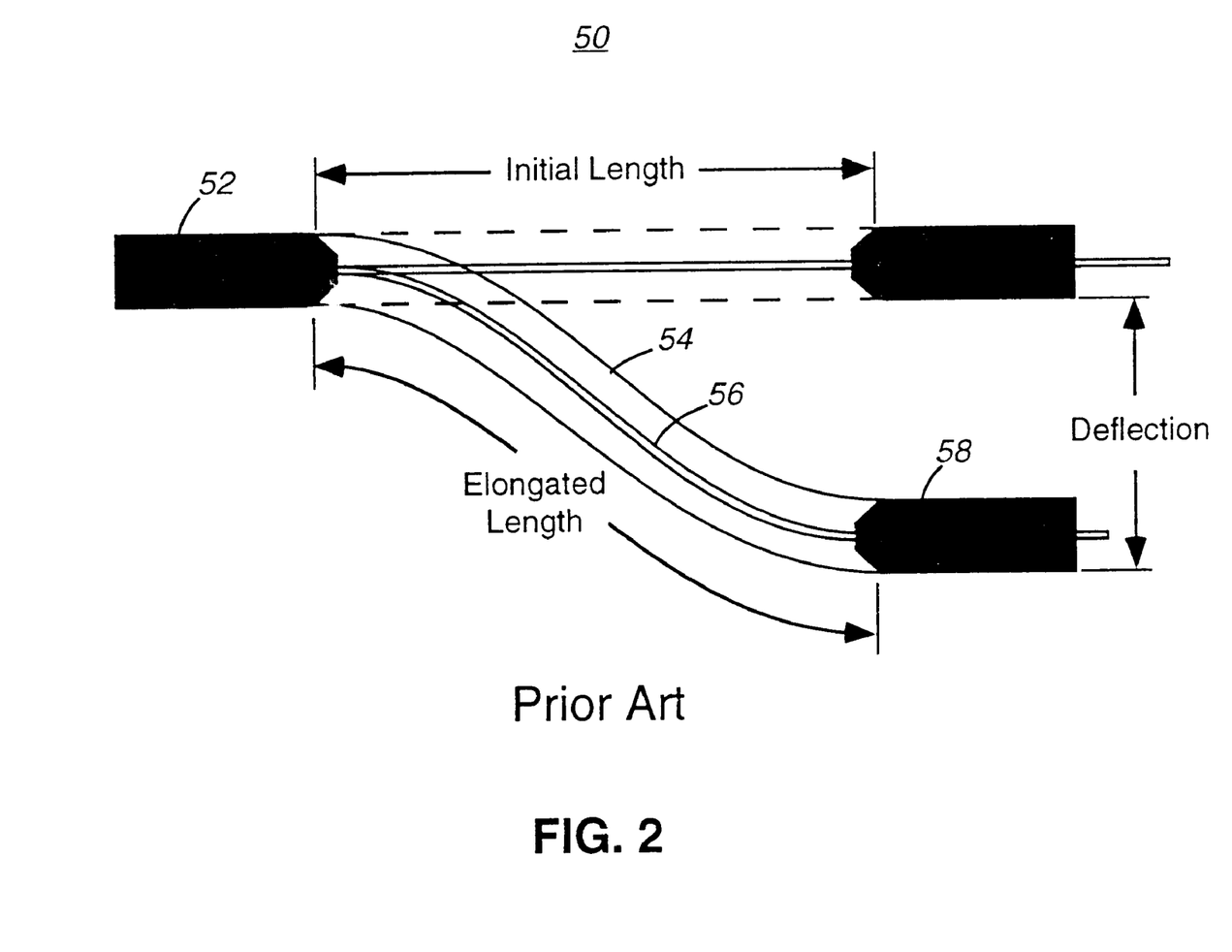
FIG. 2 is a side view of a prior art reinforce elastomer being elongated and deflected.

However, a number of problems have been found with the prior art. The rod blocks 52, 58 are made of solid metal and are heavy. In addition, the holes have to be drilled through the rod blocks. Because of the length of these holes the drill bits break often, making this an expensive slow process. Another problem that has occurred is that the rods 56 tend to rub along the holes in the rod block 58. The rods rub as they slide along the rod block 58, when the elastomeric panel 50 is elongated or deflected as shown in FIG. 2. This significantly reduces the cycle life of the panel and results in the whole panel 50 having to be replaced.

Thus there exists a need for a reinforced elastomer panel that overcomes these and other problems.

SUMMARY OF THE INVENTION

A reinforced elastomer panel that overcomes these and other problems has a first rigid member with an edge attached to a first end of an elastomeric panel. Also attached to the first rigid member is a reinforcing member that extends through the elastomer panel. A second rigid member has an edge attached to a second end of the elastomer panel. A flexible inelastic strip runs along an attachment line between the first rigid member and the elastomeric panel.

DETAILED DESCRIPTION OF THE DRAWINGS

Figure 3A:
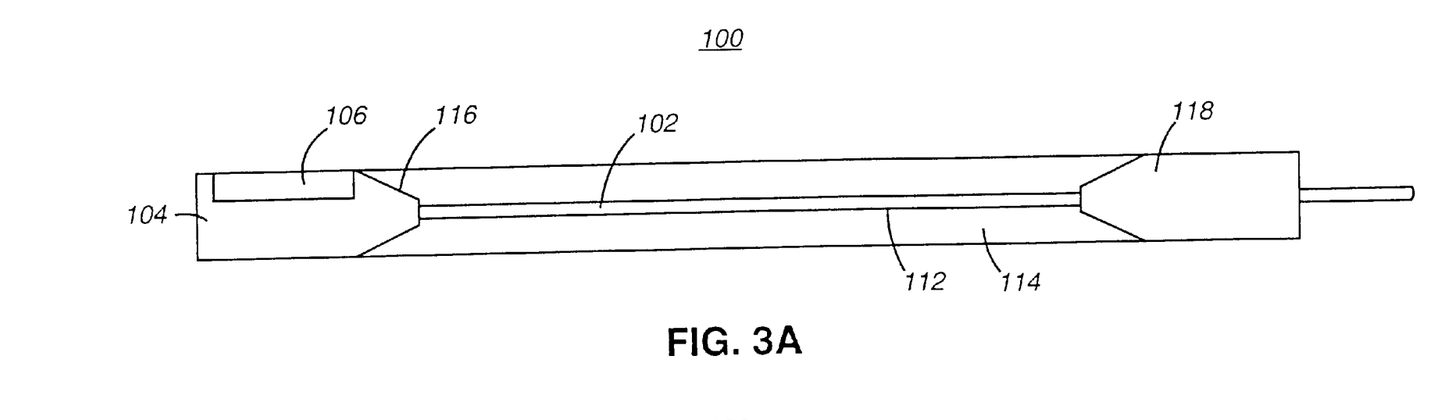
FIGS. 3A & B are cross sectional side views of a reinforced elastomer panel according to the invention.
Figure 3B:
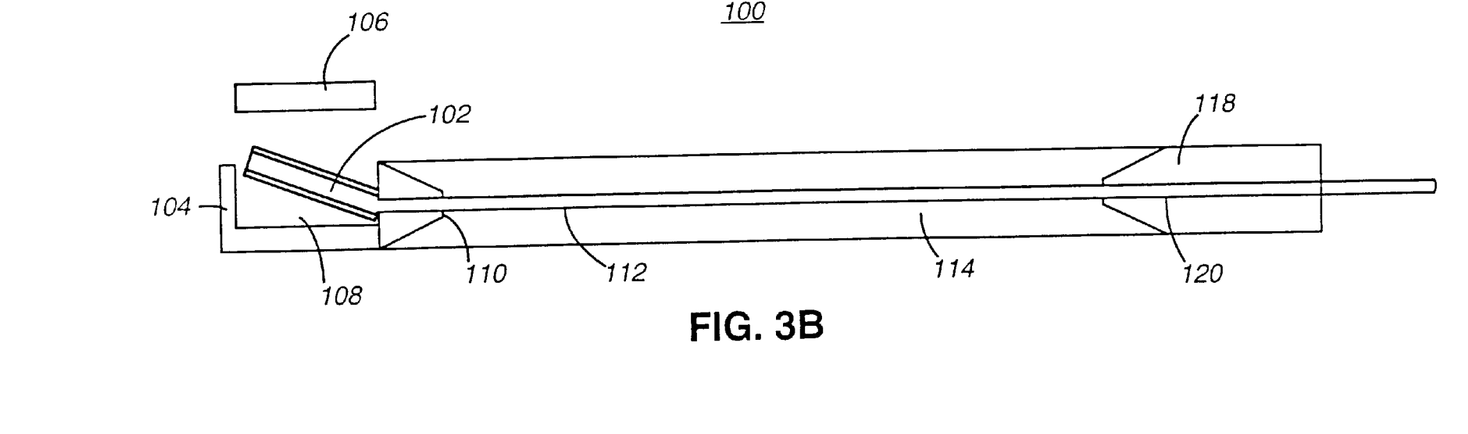

FIGS. 3A & B show a reinforced elastomer panel 100 that allows easy replacement of any of the plurality of reinforcing members 102. The reinforced elastomer panel 100 has a first block 104 with a removable plate 106 that provides access to a plurality of cavities 108. The plurality of cavities 108 contain the plurality of reinforcing members 102. An access hole 110 in each of the cavities 108 of the first block 104 allows the reinforcing members 102 passage into one of the plurality of holes 112 in an elastomeric sheet 114. The elastomer sheet 114 is attached to an interior edge 116 of the first block 104. A second block 118 is attached to the other end of the elastomer sheet 114. The second block 118 has a plurality of voids 120 through which the plurality of reinforcing members 112 extend.

Figure 4:
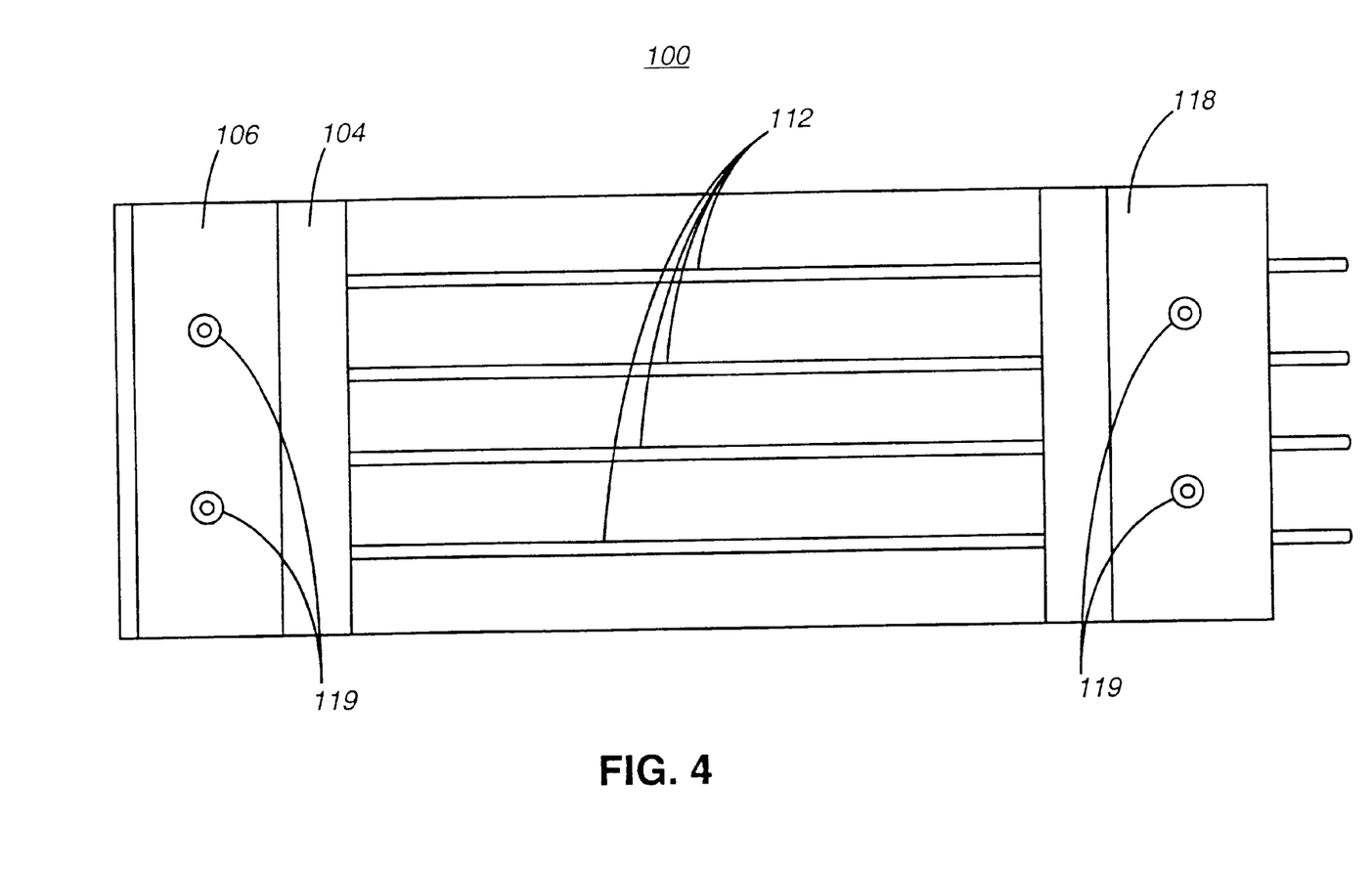
FIG. 4 is a top view of the reinforced elastomer panel of FIGS. 3A & B.

FIG. 4 is a top view of the reinforced elastomeric panel 100. In this view the removable plate 106 can be seen to extend along the complete length of the first block 104. Attachment provisions 119 are shown as countersunk. A screw would then hold the removable lid 106 to the first block 104. Other attachment provisions will be obvious to those skilled in the art. Any such attachment provisions are considered part of the invention as defined in the appended claims. The description will not discuss attachment provisions for the other embodiments of the reinforced elastomeric because a number of attachment provisions are possible and add nothing to the understanding of the invention.

Figure 5:
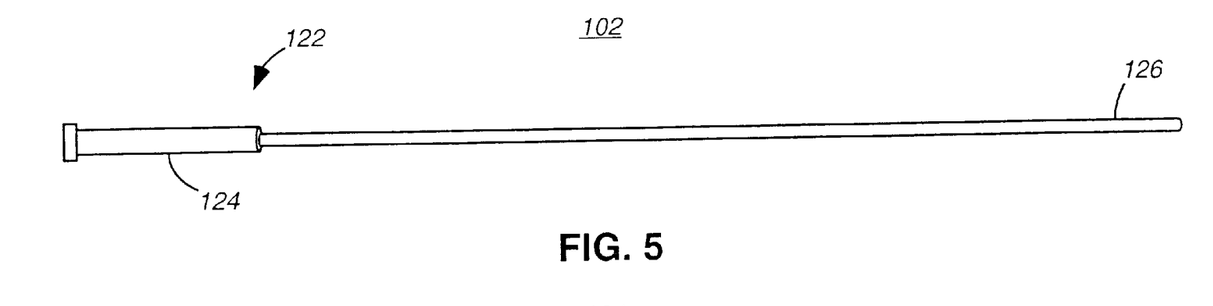
FIG. 5 is a top view of a reinforcement member used with the reinforcement elastomer panel of FIGS. 3A & B.

FIG. 5 shows a reinforcing member 102. The first end 122 of the reinforcing member 102 has a keyed flanged bushing (flanged bushing) 124 attached to it. The keyed flanged bushing 124 fits inside the cavity 108 formed by an interior surface (wall) of the removable lid 106 and the cavity 108. The second end 126 slides into the hole 112 in the elastomer sheet 114 and through the cavity 120 in the second block 118. The flanged bushing 124 keeps the reinforcing member 102 secured inside the cavity 108. When the reinforcing member 102 needs to be replaced, the removable lid 106 is removed (see FIG. 3B). Once the removable lid 106 is removed, the reinforcing member 102 is pried out of the first block 104, via screwdriver slots 109. A replacement reinforcing member 102 is then inserted into the cavity 108.

Figure 6:
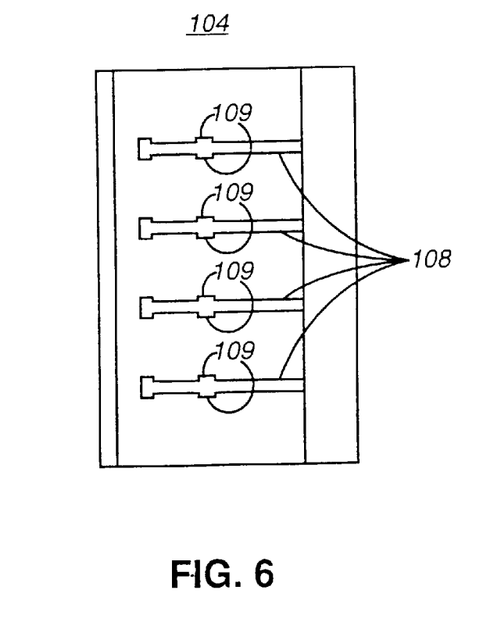
FIG. 6 is a top view of a rod block used with the reinforced elastomer panel of FIGS. 3A & B.

FIG. 6 shows the first block (base) 104 with the removable plate 106 removed. The plurality of cavities 108 are seen where the removable plate would be. The cavities (hollow space) 108 match the shape of the flanged bushing 124. As a result this embodiment allows for easy replacement of the reinforcing members.

Figure 7:
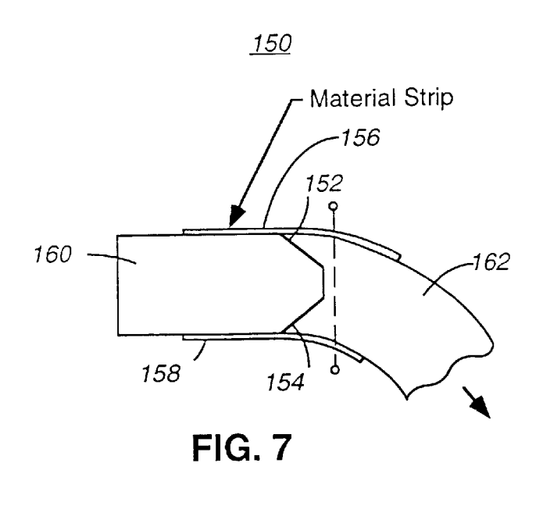
FIG. 7 is a cross sectional view of a portion of another embodiment of a reinforced elastomer panel according to the invention.

FIG. 7 shows a partial cross section of another embodiment of a reinforced elastomer panel 150. The reinforcing member is not shown in the figure. A common problem with the prior art designs was tearing along the top and bottom attachment line (bond line) 152, 154. When the panel 150 is deflected downward, a large amount of stress occurs along the top attachment line 152. Over time this extra stress leads to tearing along the attachment line (bond line) 152. To alleviate this stress a flexible inelastic strip 156, 158 is placed over the bond line 152, 154 between the first rigid member 160 and the elastomer panel 162. This reduces the stress at the bond line and spreads the stress over a greater region.

The flexible inelastic strip 156, 158 can be made from fiberglass, reinforced cloth, metal sheets, screens or other non-stretching fabrics. In one embodiment the flexible inelastic strip is attached with an elastomer bonding agent, such as a silicon adhesive (adhesive). In another embodiment the flexible inelastic strip is molded in place when the elastomer is attached to the first rigid member 160.

Figure 8A:
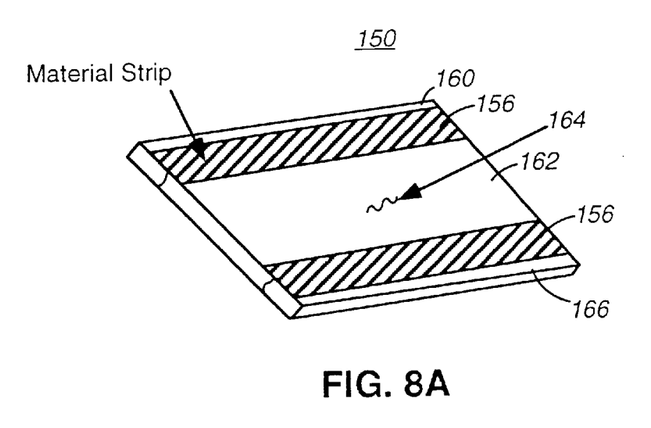
FIGS. 8A & B are perspective views of the reinforced elastomer panel of FIG. 7 illustrating a method of repairing tears in the elastomer.
Figure 8B:
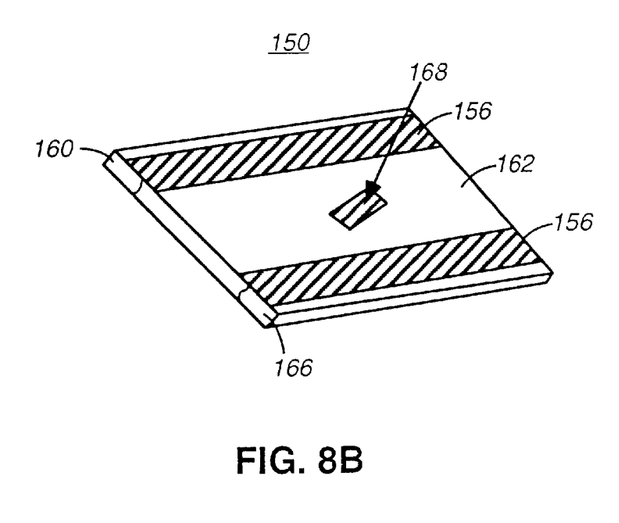

FIGS. 8A & B show a method of repairing a tear 164 in the elastomer sheet 162. The embodiment shown in FIG. 8A shows the flexible inelastic strip (strip of flexible material) 156 covering the bond line between the second rigid member 166 and the elastomer panel 162. The tear 164 is covered with a piece of the flexible inelastic strips 168 in FIG. 8B. The elastomer panel 162 is repaired by first removing any stress from the reinforced panel 150. Next an area on the elastomer surface around the tear (damaged area) 164 is prepared for an adhesive. This can include cleaning the elastomer and other steps such as roughing up the area. Next an adhesive is placed on the area. The flexible inelastic patch 168 is then placed over the adhesive. Finally, the adhesive is cured. The flexible inelastic strip keeps the tear from spreading.

Figure 9A:
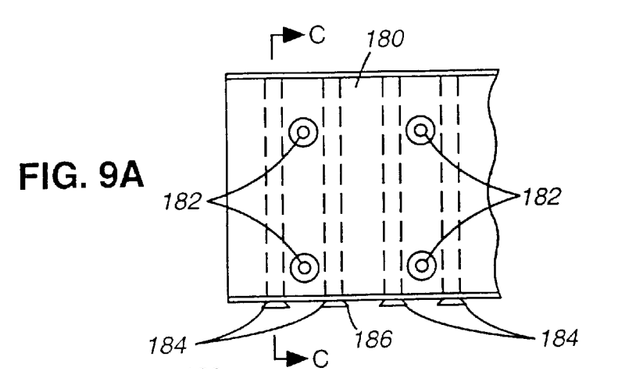
FIGS. 9A, B & C are different views of another embodiment of a structural block for a reinforcement elastomer panel according to the invention.
Figure 9B:
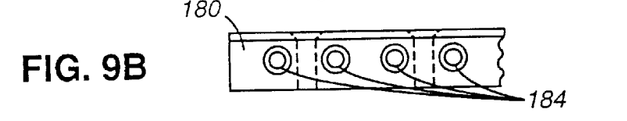
Figure 9C:
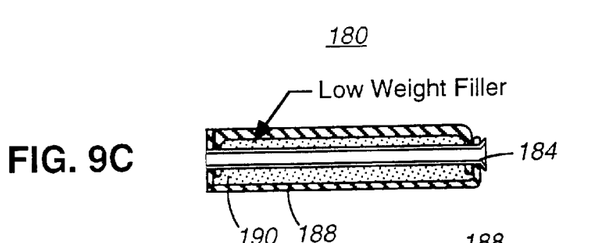

FIGS. 9A, B & C show another embodiment of a rod block for a reinforced elastomer panel. The structural block 180 has a plurality of countersunk holes 182 for attachment. The structural block (second structural block) 180 has a sleeve(s) 184 that extends into the structural block 180. The sleeves 184 have flared ends 186 that allow the reinforcing members (flexible rib) to slide more easily inside the structural block 180. In one embodiment the sleeve 186 is made of steel, brass, beryllium, copper, phosphor-bronze or some other lubricant compatible material. In another embodiment the sleeves are coated with a lubricant, such as oil, silicone or coated with Teflon®. The fluted ends (flared ends) 186 of the sleeves 184 are encased in the elastomer panel. The structural block 180 is a metal box 188. In one embodiment the metal box 188 is formed from a pair of formed sheets of metal. The sheets of metal are attached to each other and holes are drilled for the sleeves 184. The inside of the metal box 188 is filled with a polymer material 190. In one embodiment the polymer material (light weight polymer material) 190 is a light weight foam material (foam filler).

Figure 10:
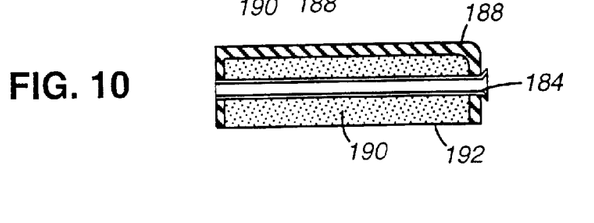
FIG. 10 is a cross sectional view of another embodiment of a structural block for a reinforced elastomer panel according to the invention.

A reinforced elastomer panel formed with the structural block 180 has the advantage of being light weight and the sleeves 184 reduce the wear and fraying of the rods. FIG. 10 shows an even lighter weight embodiment, where the one side (open side) 192 of the metal box is open. The polymer material 190 in both embodiments provides structural integrity and allows some flexing of the sleeves 184.

Figure 11A:
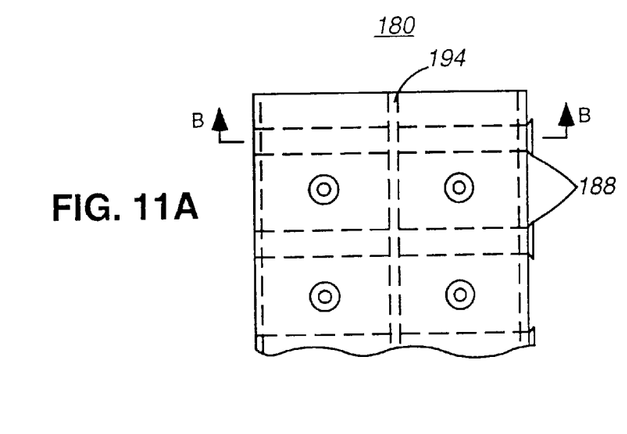
FIGS. 11A & B are different views of another embodiment of a structural block for a reinforced elastomer panel according to the invention.
Figure 11B:
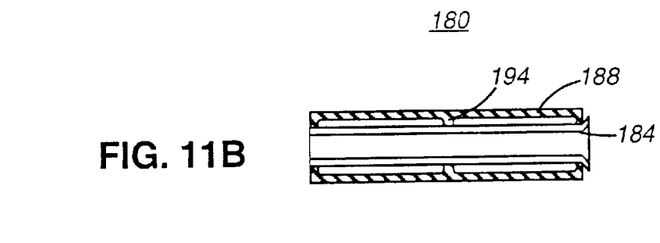

FIGS. 11A & B are similar in design to the structural blocks in FIGS. 9 & 10, except the metal box 188 is extruded. Also the metal box 188 has a strut (internal strut, reinforcing wall) 194, that provides additional structural stiffness to the structural box 180.

Figures 12, 13, 14:
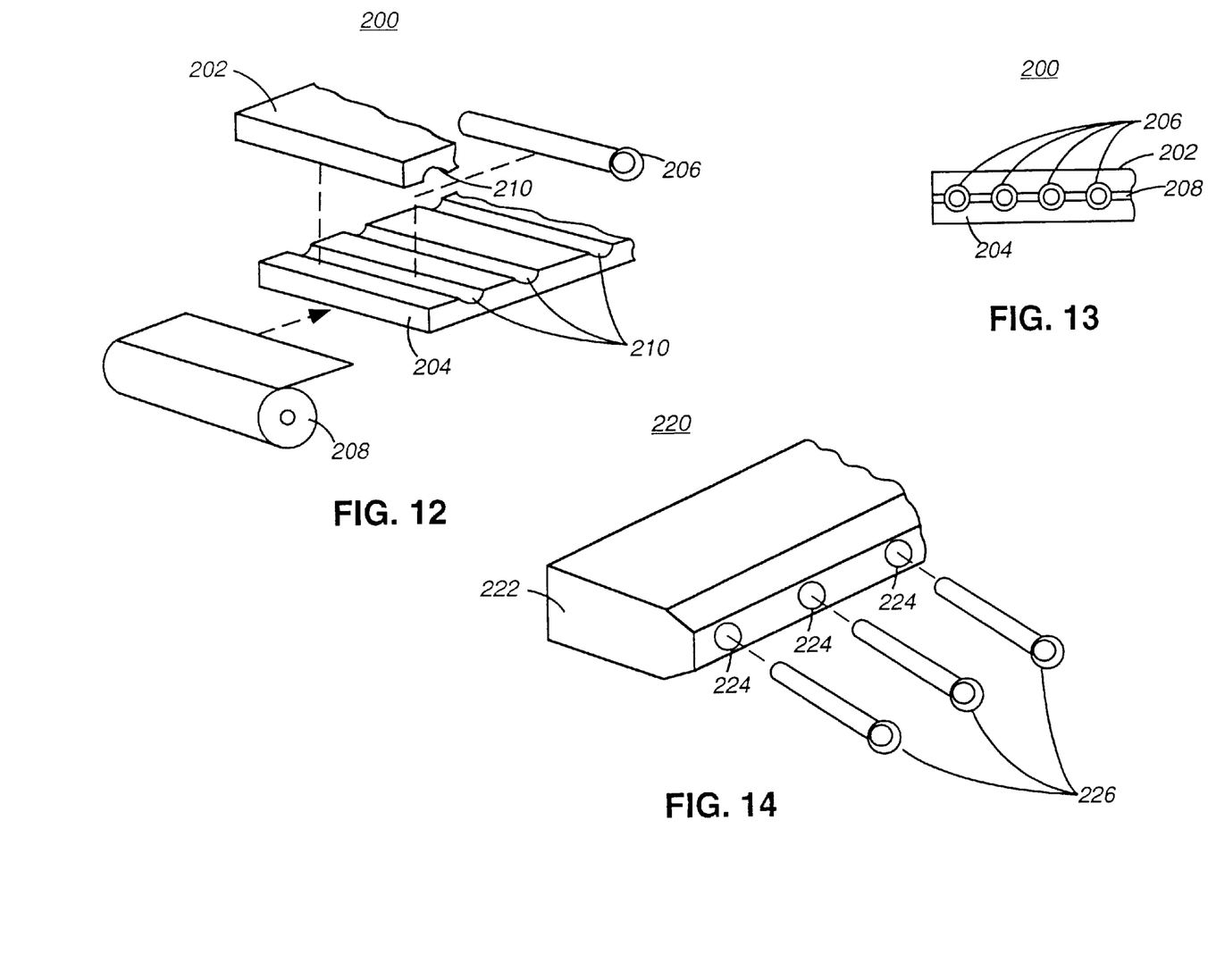
FIG. 12 is a partial exploded view of a method of making another embodiment of a structural block for a reinforced elastomer panel according to the invention.
FIG. 13 is a partial end view of structural block of FIG. 12.
FIG. 14 is a partial exploded view of a method of making another embodiment of a structural block for a reinforced elastomer panel according to the invention.

FIG. 12 shows a method of forming another embodiment of a structural block 200 for a reinforced elastomer panel. The structural block 200 has a top rigid plate 202, a bottom rigid plate 204 with a sleeve 206 between them. A polymer material 208 is used to bond the top rigid plate 202 to the bottom rigid plate 204. In one embodiment the polymer material 208 is a sheet adhesive or elastomer. A complete version of the structural block 200 is shown in FIG. 13. In one embodiment the top rigid plate 202 is made from metal. Other materials are contemplated for the rigid plates 202, 204, such as hard rubber, composites and plastics. In another embodiment the rigid plates have grooves 210 that the sleeves 206 sit in.

FIG. 14 is an embodiment of a structural block 220. In this embodiment the structural block 220 is a metal block 222 with a plurality of holes 224 drilled in the metal block. A plurality of sleeves 226 are bonded inside the plurality of holes 224.

Figures 15, 16:
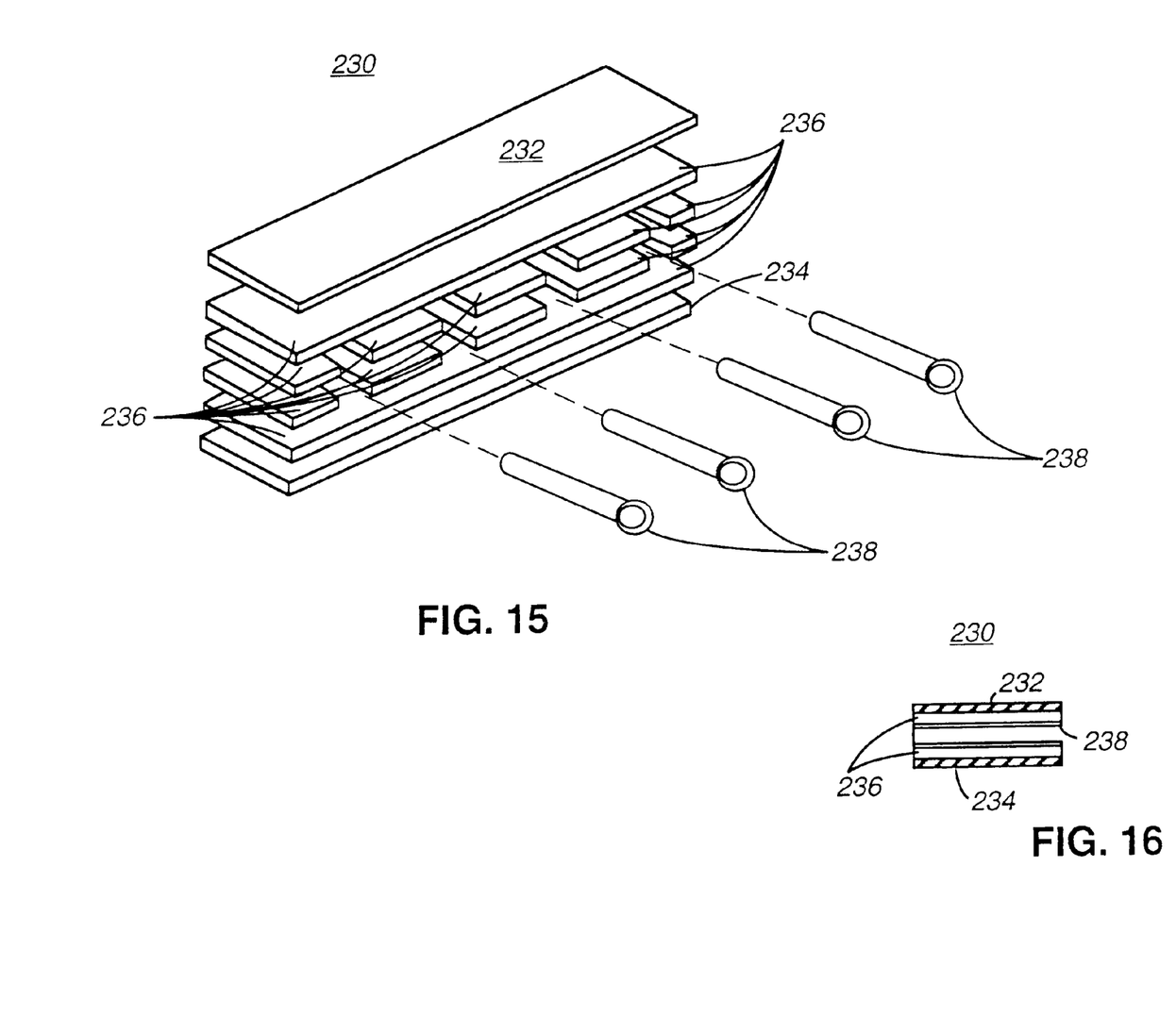
FIG. 15 is an exploded view of a method of making another embodiment of a structural block for a reinforced elastomer panel according to the invention.
FIG. 16 is a cross sectional view of the structural block of FIG. 15.

FIG. 15 shows a method of making another embodiment of a structural block 230. The structural block 230 has a top metal plate 232 and a bottom metal plate 234. A plurality of calendered elastomer pieces 236 are placed between the metal plates 232, 234. A plurality of sleeves 238 are inserted between the calendered elastomer pieces 236. The lay-up is then processed to cause the elastomer pieces 236 to adhere to the plates 232, 234 and the sleeves 238. In addition the elastomer pieces 236 fuse together. FIG. 16 shows a cross section through one of the sleeves of a completed structural book 230.

Figure 17A:
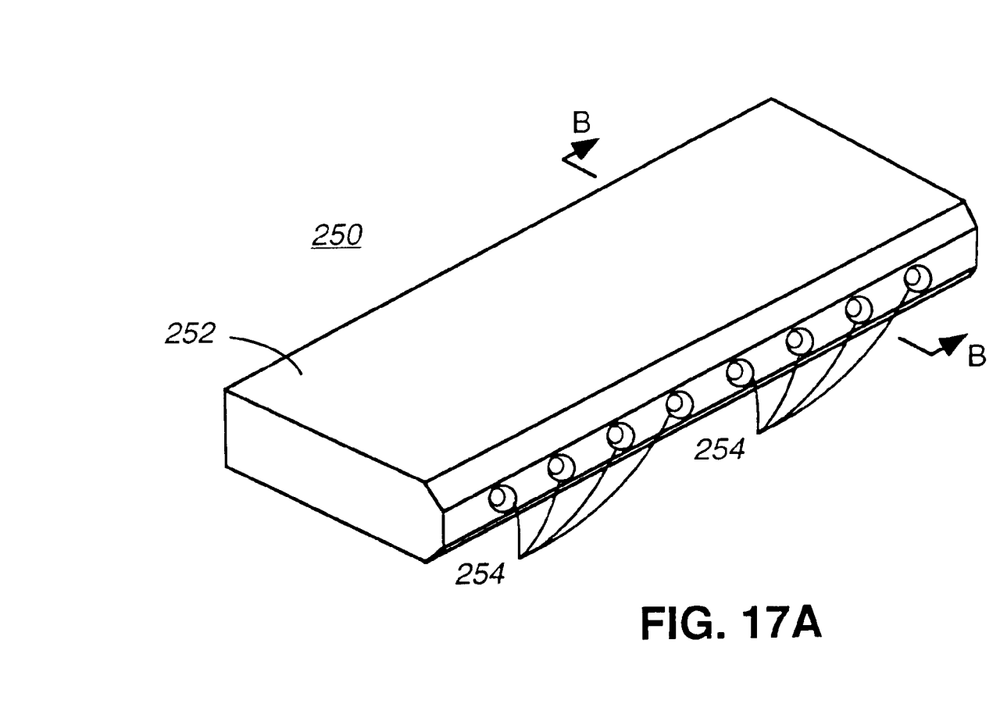
FIGS. 17A & B are different views of another embodiment of a structural block for a reinforced elastomer panel according to the invention.
Figure 17B:
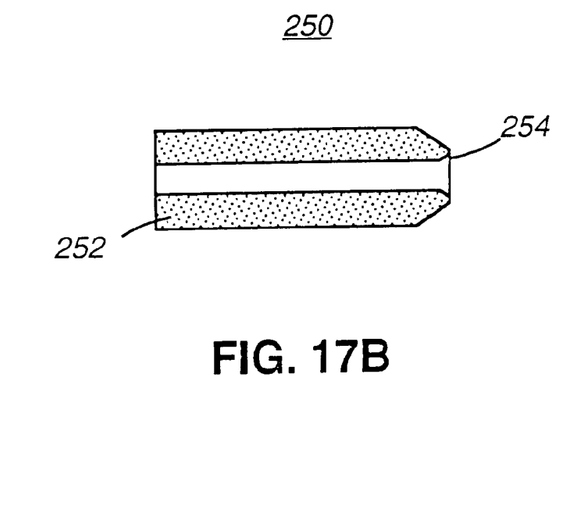

FIGS. 17A & B show another embodiment of a structural block 250. In this embodiment the structural block 250 is molded. This can be accomplished by cast or injection molding. In this case the structural block 252 is made of an injection molded material, such as plastic, epoxy, or long fiber reinforced thermoplastic. The structural block 252 includes a plurality of sleeves (plurality of sacrificial bushings) 254. In another version the structural block 250 is formed as a composite lay-up.

Figure 18:
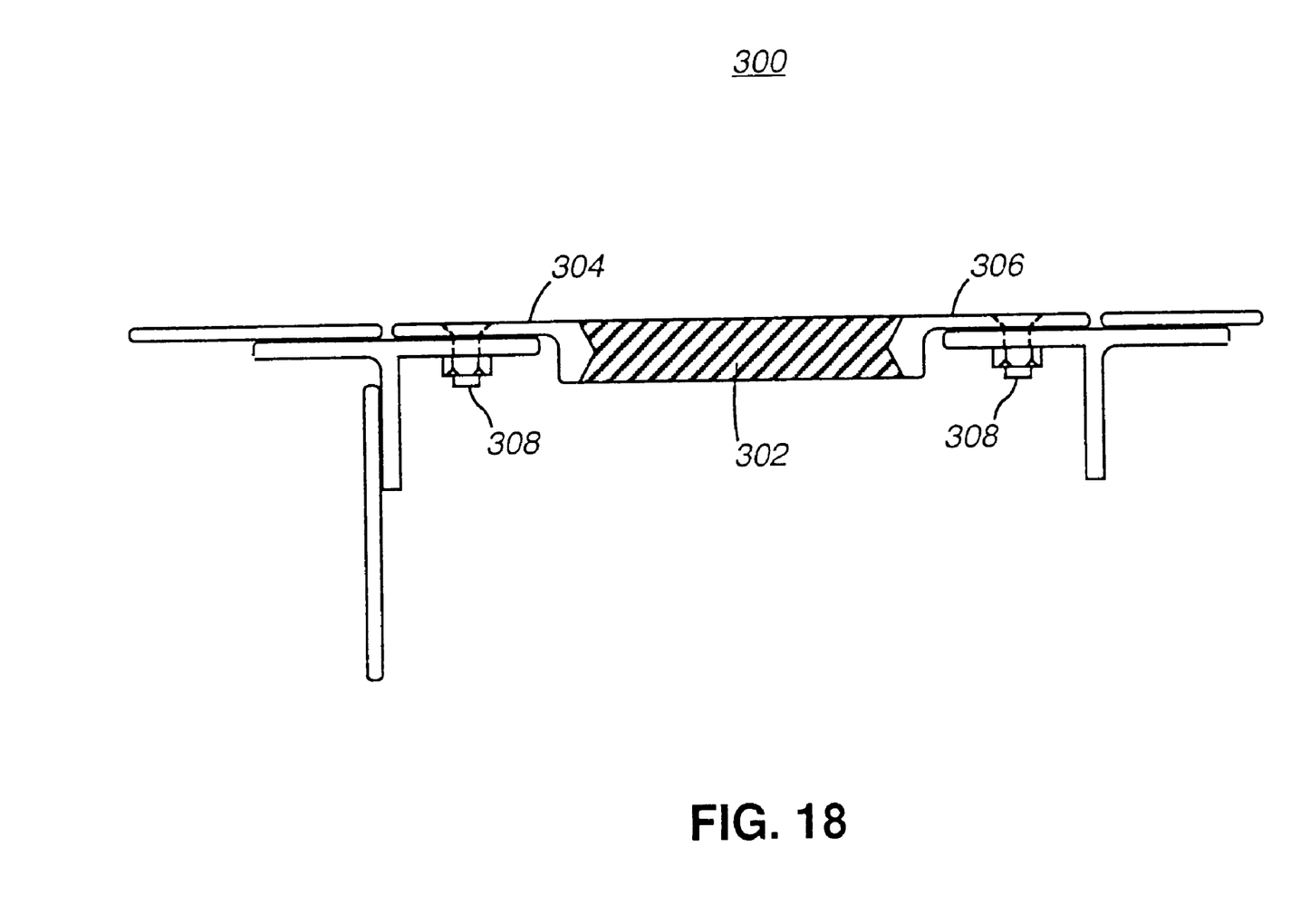
FIG. 18 is a cross sectional view of an elastomer panel.

FIG. 18 is shows an elastomer panel 300. The elastomer panel 300 does not have any reinforcing members. In cases where an elastic panel is needed, but the panel will only undergo elongation or bending, no reinforcing members will be necessary for small spans. As a result the weight of the elastomer panel 300 can be significantly reduced. The elastomer sheet 302 is attached to a rigid block 304 at a first end and to a second rigid block 306 at a second end. The rigid blocks 304, 306 are L shaped to reduce the weight. In addition, the blocks 304, 306 can be formed of metal, plastic, rubber, or composites (composite material) depending on the weight to strength tradeoffs for the application. In the embodiment shown the elastomer panel 300 is attached to the aircraft by bolts 308.

Figure 19:
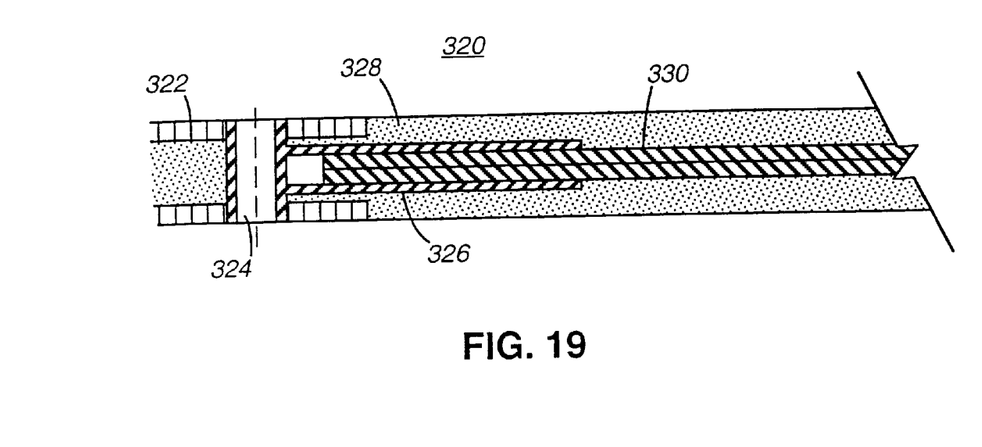
FIG. 19 is a partial cross sectional view of another embodiment of a reinforced elastomer panel according to the invention.

FIG. 19 shows a partial view of another embodiment of a reinforced elastomer panel 320. The rigid structural block 322 has attachment provisions 324. In this embodiment the sleeve 326 extends into the elastomer panel 328. The reinforcing rod 330 slides inside the sleeve 326. This embodiment has the advantage that rods 330 do not extend beyond the rigid structural block 322.

Figure 20:
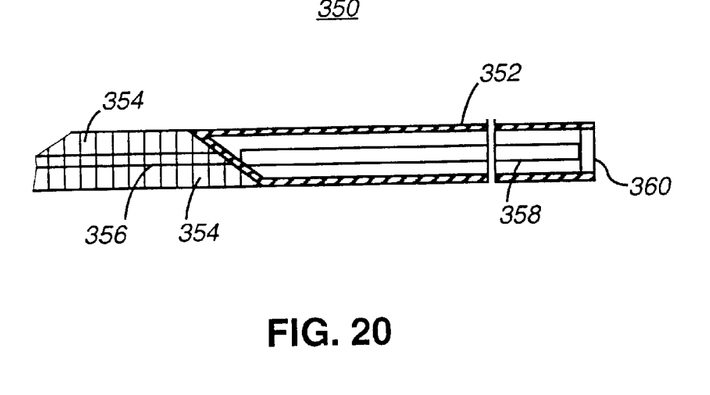
FIG. 20 is a cross sectional view of another embodiment of a reinforced elastomer panel.
Figure 21:
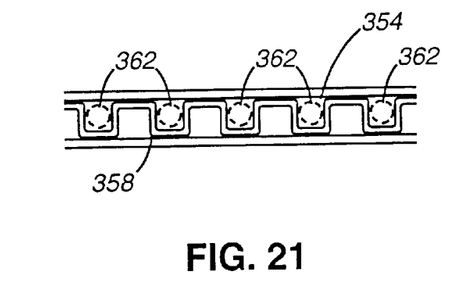
FIG. 21 is a cross sectional view of the rod block of the reinforced elastomer panel of FIG. 20.

FIGS. 20 & 21 show a partial view of another embodiment of a reinforced elastomer panel 350. In this case the rigid block 352 is a metal box (metal rectangular container) 354 attached to an elastomer sheet 354. A plurality of reinforcing members 356 extend from the rigid block 352 into the elastomer sheet 354. A corrugated rigid sheet 358 is inserted into the end 360 of the metal box 352. The corrugated rigid sheet forms a plurality of cavities 362 for the reinforcing members 356. In another embodiment, the sleeves are inserted into the cavities.

Thus there has been described a reinforced elastomer panel that is light weight, allows for easy replacement of broken reinforcing members and reduces the wear and fraying of the reinforcing members. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A reinforced elastomer plate, comprising:

a structural body;

a flexible rib having a first end inside the structural block;

an elastomer panel encapsulating a portion of the flexible rib and attached to an edge of the structural block;

a second structural block having an edge attached to the elastomer panel and having a sleeve extending into the second structural block.

2. The reinforced elastomer plate of claim 1, wherein the flexible rib has a second end extending through the sleeve.

3. The reinforced elastomer plate of claim 1, wherein the second structural block is a metal box.

4. A reinforced elastomer plate, comprising:

a first structural block;

a flexible rib having a first end extending inside the first structural block;

an elastomer panel encapsulating a portion of the flexible rib and attached to an edge of the first structural block; and a second structural block having a sleeve extending into the second structural block, wherein the second structural box comprises a metal box, and wherein the metal box contains a polymer material.

5. A reinforced elastomer plate, comprising:

a first structural block comprising a metal box, wherein the metal box contains a polymer material;

a flexible rib having a first end inside the first structural block;

an elastomer panel encapsulating a portion of the flexible rib and attached to an edge of the first structural block; and a second structural block having a sleeve extending into the second structural block.

6. A reinforced elastomer plate, comprising:

a first structural block;

a second structural block;

a flexible rib having a first end extending inside one of said structural blocks; and one of said structural blocks comprising a metal box having a sleeve extending therein, said sleeve being at least partially encapsulated with a polymer material diposed within said box.

* * * * *